(No Model.)  5 Sheets—Sheet 1.

G. W. HOWSER.
ELECTRIC CALL.

No. 260,982.  Patented July 11, 1882.

WITNESSES  
W. H. H. Knight  
Fred F. Church

INVENTOR  
George W. Howser  
by Melville Church  
His Attorney (No Model.)

G. W. HOWSER.
ELECTRIC CALL.

No. 260,982. Patented July 11, 1882.

WITNESSES
W. H. H. Knight
Fred F. Church

INVENTOR
George W. Howser
By Melville Church
His Attorney (No Model.)

G. W. HOWSER.
ELECTRIC CALL.

No. 260,982. Patented July 11, 1882.

WITNESSES
INVENTOR (No Model.)
G. W. HOWSER.
ELECTRIC CALL.
No. 260,982. Patented July 11, 1882.
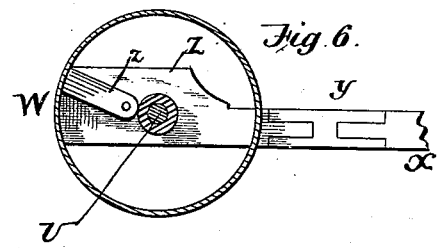
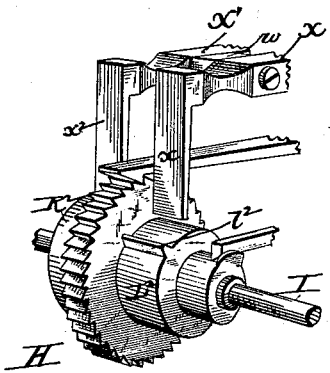
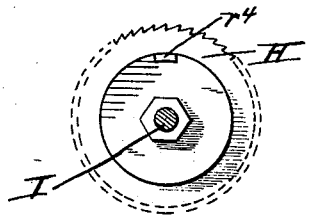
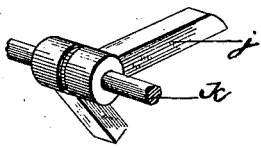
WITNESSES
INVENTOR

UNITED STATES PATENT OFFICE.

GEORGE W. HOWSER, OF CHICAGO, ILLINOIS.

ELECTRIC CALL.

SPECIFICATION forming part of Letters Patent No. 260,982, dated July 11, 1882.

Application filed April 17, 1882. (No model.)

*To all whom it may concern:*

Be it known that I, GEORGE W. HOWSER, of Chicago, in the county of Cook and State of Illinois, have invented certain new and useful Improvements in Electric Calls; and I do hereby declare the following to be a full, clear, and exact description of the same, reference being had to the accompanying drawings, forming part of this specification, in which—

Figure 1:
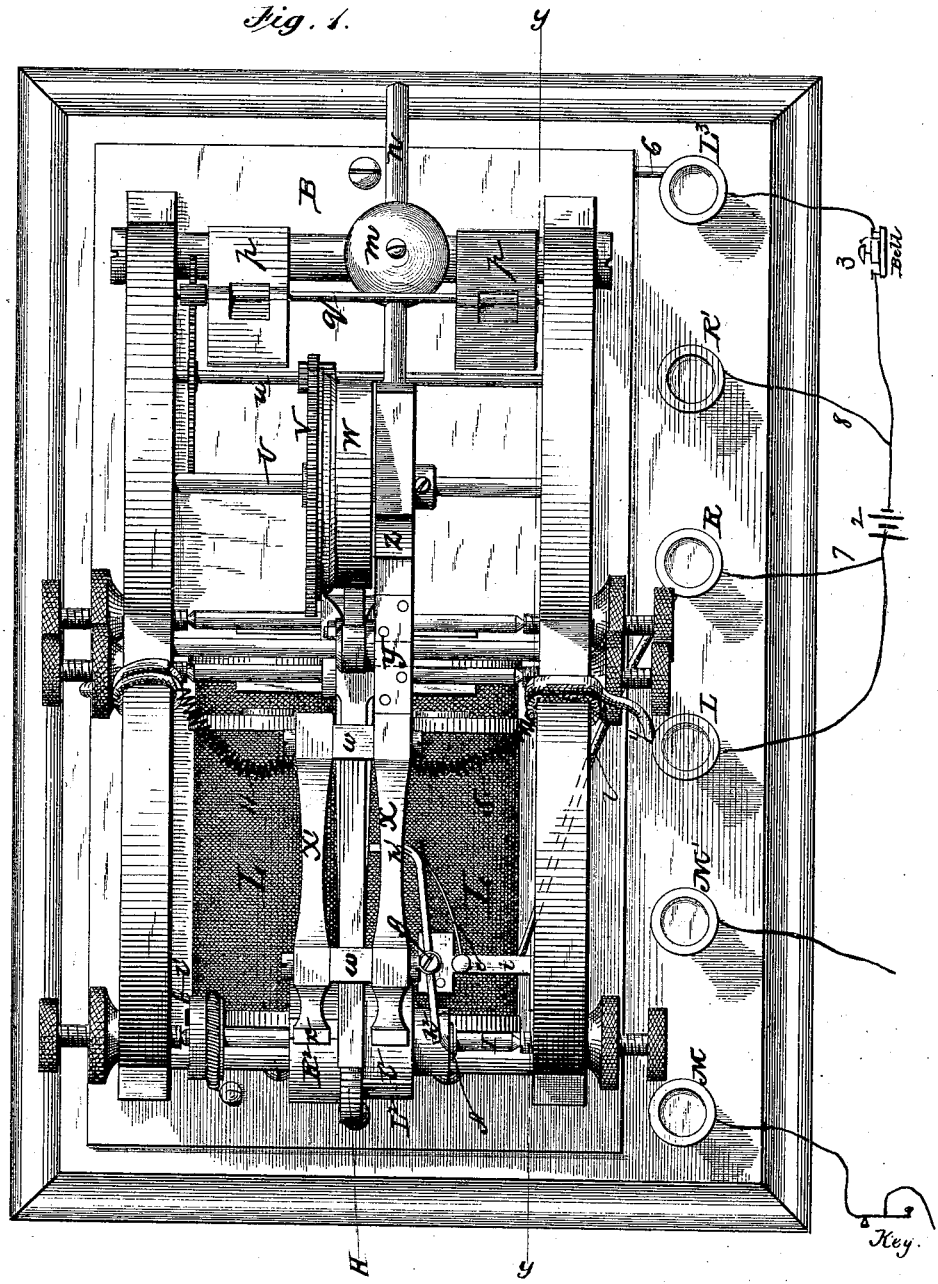
Figure 2:
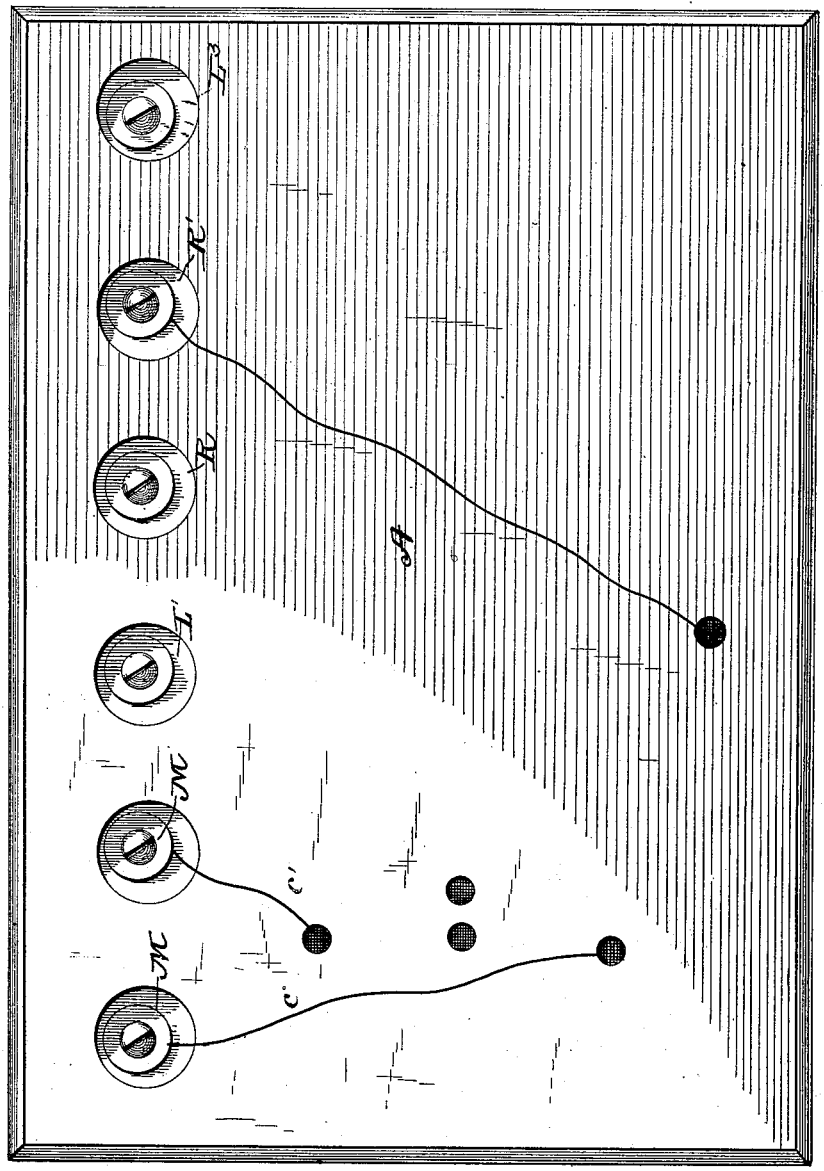
Figure 3:
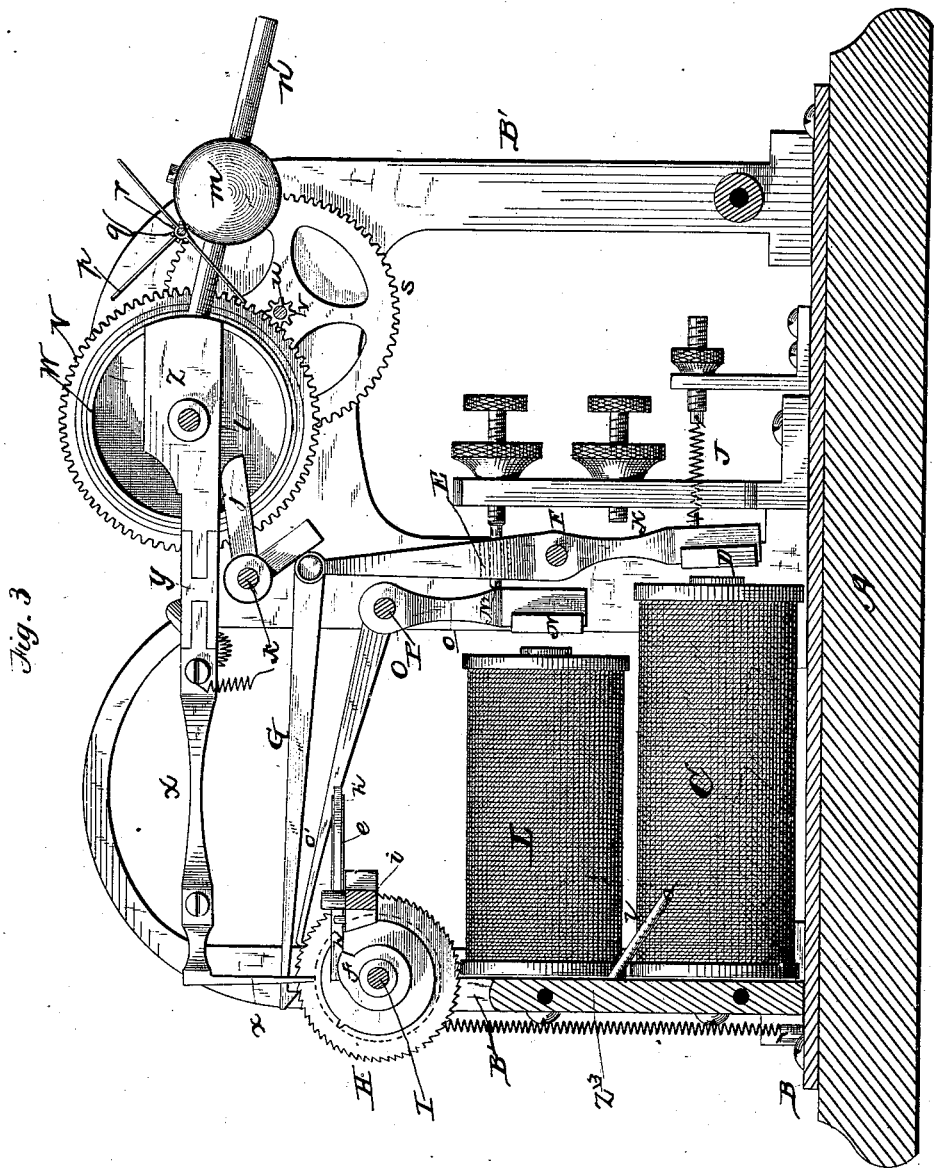
Figure 4:
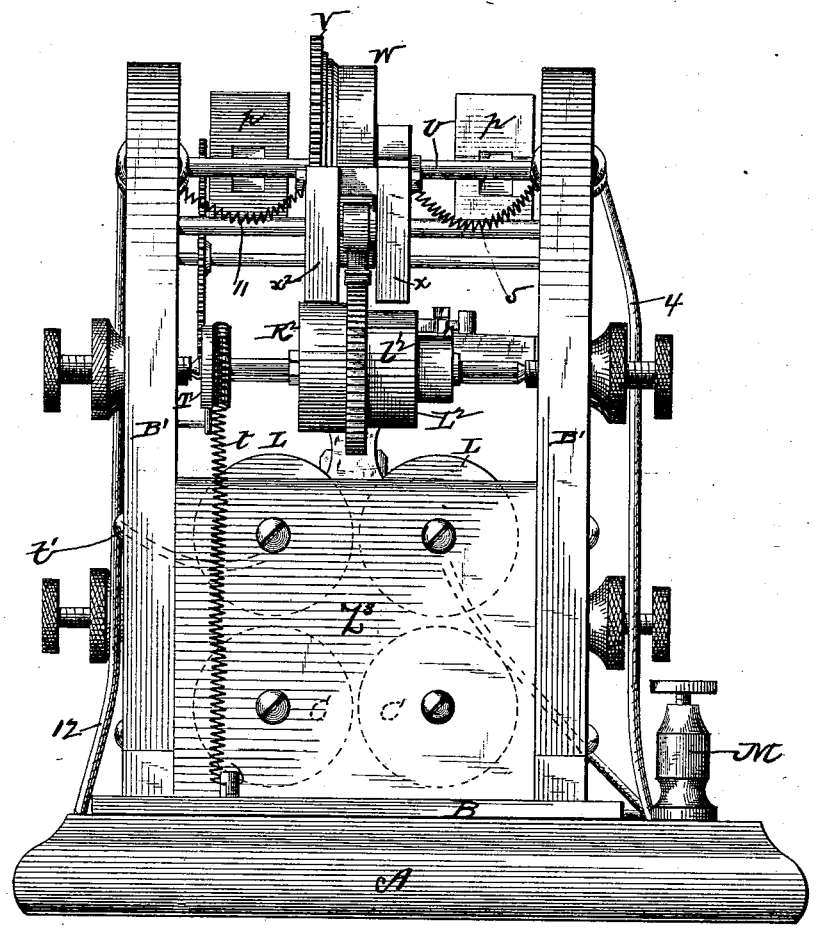

Figure 1 is a top plan view of my improved instrument. Fig. 2 is a bottom plan view of the same. Fig. 3 is a longitudinal vertical section taken on the line $y\,y$, Fig. 1. Fig. 4 is a front elevation. Figs. 5, 6, 7, 8, and 9 are views of details of the mechanism.

Similar letters of reference in the several figures denote the same parts.

My invention has for its object to provide improved means for automatically controlling telephone, telegraph, and other electric circuits, and, as applied to telephone-circuits, to provide means whereby an operator at any given station on a main line can call any particular station on said main line without calling any other station than the one desired, and after calling leave the line and the calling mechanisms at all the stations in normal position, so as to be ready to respond to their appropriate calls made subsequently.

The means employed in carrying out my invention I will now proceed to describe, and so much thereof as I regard as new I will make the subject of specific claims at the end of this specification.

In the drawings, A represents a non-conducting base-piece of an instrument such as I employ at each station on the main line. Mounted upon this base-piece is a metal frame consisting of bottom plate, B, uprights B', and suitable connecting cross-bars, as shown.

C C are connected electro-magnets, the terminal wires $c\,c'$ of which lead respectively to binding-posts M M', to which the main-line wires are connected. The armature D of these magnets is mounted upon the lower end of an arm, E, that is fixed at or near its center to a rock-shaft, F, having its bearings in the uprights of the frame. To the upper end of the arm E is articulated a gravitating pawl-arm, G, whose outer hooked end is adapted to engage with the teeth of a ratchet-wheel, H, mounted on an arbor, I, journaled in the uprights of the frame, as shown. When the main line, which is a normally-closed circuit, is closed, the armature D is drawn up against the cores of the electro-magnets C C, against the tension of an adjustable spring, J; but when the main line is opened or broken the stress of the spring J draws the armature back a distance regulated by an adjustable back stop, K.

Over the electro-magnets C C are arranged two other connected electro-magnets, L L, the terminal wires $l\,l'$ of which lead respectively to the binding-post R and to one of the uprights B' of the frame, as shown. The armature N of these electro-magnets L L is secured to the depending arm $o$ of a bell-crank lever, O, affixed to a rock-shaft, P, also having its bearings in the uprights of the frame. The longer arm $o'$ of said bell-crank lever O has a hooked outer end, which is also adapted to engage with the teeth of the ratchet-wheel H and act as a keeper to hold the ratchet-wheel from backward rotation when the gravitating pawl-arm G advances to engage with the next succeeding tooth of said ratchet-wheel. The extent of the vibration of the armature N is regulated by a back stop, $N^2$.

Mounted on the arbor I, on one side of the ratchet-wheel H, is a metal cylinder, $R^2$, and on the other side of said ratchet-wheel is mounted another metal cylinder, $L^2$, both said cylinders being fixed to the arbor so as to rotate therewith and with the ratchet-wheel. Also secured to said arbor I is a disk, T, to a stud or pin on the periphery of which is connected one end of a light spiral spring, $t$, the other end of the spring being secured to the base-plate B. When the ratchet-wheel is rotated by the action of the pawl-arm G the spring $t$ is extended and wound upon the disk T; but when the ratchet-wheel is relieved by the disconnection of both the pawl-arm G and the keeper $o'$, in a manner to be further on explained, the spring will assert itself and rotate the arbor and everything upon it back again to normal or starting point.

U is a shaft having its bearings in the metal frame, and carrying near its center a rigidly-attached gear-wheel, V, which has a wide circular flange, W, extending out from its side, as shown.

Mounted loosely upon the shaft U is a lever, X Y Z, to the side of the part Z of which is pivoted a gravitating friction-block, $z$, which, when the outer end of the lever X Y Z is raised, slides over the inner surface of the circular flange W of the wheel V without engaging therewith, but which, when the outer end of said lever descends, binds or cramps against the said flange and causes the wheel W to rotate. The parts X and Z of the lever are preferably of metal, while the part Y is of wood or some other insulating material. The part X has a downwardly-projecting finger, $x$, which, when at its lowest point of descent, projects in close proximity to but not in contact with the surface of the cylinder $L^2$, though in the path of a metal projecting rib, $l^2$, on said cylinder.

Mounted upon and moving with the part X of the lever, but insulated from it by insulating-blocks $w\,w$, is another metal part, $X'$, similar to the part X, except that its downwardly-projecting finger $x^2$ is slightly longer than the finger $x$, and when at its lowest point of descent strikes upon the surface of the cylinder $R^2$ and makes electrical contact therewith.

The teeth of the gear-wheel V mesh into a pinion, $v$, on a shaft, $u$, and another gear-wheel, $s$, on said shaft $u$ in turn meshes with a pinion, $r$, on a shaft, $q$, carrying governing-fans $p\,p$, as shown. From the rear end of the lever X Y Z projects an arm, $n$, that carries an adjustable counter-weight, $m$. This weight is adjusted so that the outer end of the lever X Y Z will more or less overbalance it. When the outer end of the lever is raised and then released it begins to slowly descend again, though somewhat tardily, owing to the retarding action of the governing-fans. Mounted upon another rock-shaft, $k$, is a small bell-crank lever, $j$, the shorter arm of which normally rests against the upper end of the armature-arm E, while its longer arm is adapted to bear against the under side of the portion Z of the lever X Y Z, and hold the outer end of the latter normally elevated. When the main circuit is broken the bell-crank lever withdraws its support from said lever X Y Z and allows its outer end to descend; but every time the circuit is completed again the arm is caused to rise.

$L'\,L^3$ are the binding-posts, to which are connected the wires forming part of a bell-circuit containing a local battery, 2, and an electric bell, 3. The bell-circuit can be traced through the instrument as follows: Starting at binding-post $L'$, it extends up insulated wire 4, thence over fine insulated wire 5 to part X of lever X Y Z, thence down to end of finger $x$, through metal rib $l^2$ on cylinder $L^2$, through arbor I to metal frame, and from metal frame over wire 6 to binding-post $L^3$.

The relief or releasing circuit for setting the instrument back to normal position after receiving a call includes the local battery 2, and extends from said battery over wire 7 to binding-post R; thence over insulated wire $l$ to the electro-magnets L L, through the latter and by wire $l'$ to one of the uprights $B'$ of the metal frame, thence through arbor I and cylinder $R^2$ to finger $x^2$ of metal part $X'$, from part $X'$ to fine insulated wire 11, to insulated wire 12, down the latter through the insulating-base, and across the base to binding-post $R'$, and over wire 8 to the local battery again. The completion of the releasing-circuit by the falling of the finger $x^2$ upon the surface of the cylinder $R^2$ causes the release armature N to be drawn toward the electro-magnets L L, and the long arm or keeper $o'$ of the lever O to be lifted from engagement with the ratchet-wheel. The long arm or keeper $o'$, in rising, strikes the gravitating pawl-arm G, and lifts that also out of engagement with the ratchet-wheel, so as to permit the latter to be rotated back to starting-point.

In order to hold both the keeper $o'$ and pawl-arm G clear of the ratchet-wheel when the latter is rotating back to starting-point, I mount upon an angular bracket, $i$, projecting inward from one of the uprights of the metal frame, a small lever, $h$, the same being pivoted at $g$, and having its longer arm, $h'$, curved or bent inward toward the keeper $o'$, and its shorter or outer arm, $h^2$, substantially straight and projecting in the path of a cam, $f$, mounted upon and rotating with the arbor I. The inner curved end, $h'$, of the lever has applied to it a light spring, $e$, the tendency of which is to force the said arm toward the keeper. When the ratchet-wheel is at its normal or starting point the cam $f$ bears against the outer short end, $h^2$, of the lever, and keeps the lever turned so that the curved end $h'$ will be out of engagement with the keeper $o'$; but as the ratchet-wheel is advanced by the operation of the pawl-arm the said cam leaves the end $h^2$ of the arm, and then the spring presses the curved end $h'$ against the side of the keeper $o'$. When, now, the keeper rises upon the completion of the relief-circuit, as before described, the end $h'$ of the arm passes under the keeper and keeps it positively elevated above the ratchet-wheel until the latter has rotated back to its normal or starting point, when the cam $f$, again coming into contact with short arm $h^2$, pulls the arm $h'$ from under the keeper, and lets the latter and the pawl again engage with the ratchet-wheel.

Now, let it be supposed that there are twenty or any other desired number of stations on the main line, each having an instrument such as above described, and each provided with local battery, bell-circuit, and relief-circuit of its own, as well as an ordinary signaling-key, $c$, interposed in the main line, and adapted to open and close said main line. The signaling-rib $l^2$ on the cylinder $L^2$ of each instrument is located at a different distance from the starting or normal point—that is to say, the rib on the cylinder at station No. 2 is placed at a point where it will be struck by the finger $x$ on the vibrating lever X Y Z of the instrument at that station, if the finger is allowed to fully descend after the main circuit has been opened twice by the pressure of the signaling-key twice at any of the stations on the line, while the rib on the cylinder at station No. 4 is placed so that it will be struck by the finger of the lever when the latter is allowed to fully descend after the circuit is broken four times by the manipulation of the key at any station, and so on throughout all the stations. Normally the main line is closed, and the armatures D of the instruments at all the stations are drawn against their magnets C C, all the levers X Y Z are elevated, and all the ratchet-wheels, cylinders, &c., on the arbors I are at the neutral or starting point. With all the instruments thus set, if the operator at station No. 2 wishes to call station No. 4 he simply depresses his signaling-key four times, so as to break and make the circuit four times in rapid succession, and at the fourth depression he keeps the key down. At each depression of the key the armatures D of all the instruments on the line are released from their magnets, the pawl-arms G advance to the next tooth on the ratchet-wheels, and the levers X Y Z begin to descend; but before the latter fully descend the next depression of the key occurs, and the armatures D are again attracted to their magnets, and the levers X Y Z are caused to ascend again. This operation is repeated until the key is held down at the fourth depression. Then the levers X Y Z at all the stations fully descend, and at every station except station No. 4 the longer finger, $x^2$, strikes the cylinder $R^2$ and completes the relief-circuit, thus bringing the instrument back to normal position, while at said station No. 4 the shorter finger, $x$, strikes the signaling-rib $l^2$ on the cylinder $L^2$, and completes the bell-circuit and sounds the bell at that station; but the longer finger, $x^2$, at said station No. 4 makes no contact whatever. So long as the key remains depressed the bell at station No. 4 will ring, and when the signal has been heard it only remains to reset the instrument at said station No. 4 in order to put the line in condition for another call to be made. This is accomplished by making one make and break of the main circuit at any of the stations, whereupon the signaling-rib $l^2$ at station No. 4 will be caused to pass by the finger $x$, and the finger $x^2$ allowed to descend and complete the relief-circuit at said station, fingers $x^2$ performing a like office at all the other stations. The instruments at the several stations on the line are arranged to close the bell-circuits on even numbers, or on every alternate number, so that the resetting of the instrument last called can be effected without calling any other station by the act of resetting.

By the use of my invention the necessity of a central station or "exchange" is dispensed with, and an operator at any given station can call any other individual station without disturbing any station save the one desired to be called.

It is obvious that as many electric bells may be arranged in each bell-circuit as may be desired, and that said bell-circuits may extend to any distance.

$Z^3$ represents a magnet-keeper in contact with the cores of all the electro-magnets C C L L.

While I have described the instruments as working in connection with a normally-closed main line, it is evident that they can be made to operate equally as well upon a normally-open main line; but in such case, as the circuit-closing lever will be normally down at their lowest point of descent, I provide the cylinders $R^2$ each with a strip of insulating material, $r^4$, at the point where the finger $x^2$ normally rests, as shown in Fig. 8, so that the relief-circuit may not remain closed when the instrument is set ready for operation.

Having thus described my invention, I claim as new—

1. The combination, substantially as described, of a local relief-circuit, a rotating cylinder interposed therein, a gravitating circuit-closing lever, also interposed in said circuit, and actuating mechanism which, when in motion, operates to rotate forward the cylinder by a step-by-step movement and keep the circuit-closing lever elevated, but which, when at rest, holds the cylinder stationary and permits the circuit-closing lever to descend and make contact with the cylinder, and thus close the relief-circuit, with mechanism for disengaging the actuating mechanism from the cylinder upon the closing of the relief-circuit, and means for rotating the cylinder back to starting-point.

2. The combination of local relief and bell circuits, a rotating cylinder interposed in the bell-circuit and provided with a signaling projection or rib, a cylinder interposed in the relief-circuit, a gravitating circuit-closing lever forming part of both said circuits, and actuating mechanism which, when in motion, operates to rotate forward the cylinders by a step-by-step movement and to keep the circuit-closing lever elevated, but which, when at rest, holds the cylinders stationary and permits the circuit-closing lever to descend and make contact with either the projection on the cylinder in the bell-circuit to complete the bell-circuit, or with the cylinder in the relief-circuit to set in operation the relief mechanism, according to the position of said cylinders, as set forth.

3. The combination, substantially as described, of the electro magnet or magnets in the main line, whose armature controls an actuating mechanism, the cylinder in the local bell-circuit having the signaling projection, the cylinder in the local relief-circuit, the electro magnet or magnets in the relief-circuit, whose armature controls a relief mechanism, a gravitating circuit-closing lever forming part of both local bell and relief circuits, and means for rotating the cylinders back to starting-point after they are released.

4. The combination, substantially as described, of the local bell and relief circuits, the ratchet-wheel and the two cylinders mounted on the same arbor with it, the actuating-pawl connected to the armature of the electro-magnets in the main line, the electro-magnets in the local relief-circuit, the ratchet-wheel keeper connected to the armature of said last-named magnets, the gravitating circuit-closing lever, the bell-crank lever for raising the circuit-closing lever, and the spring for rotating the ratchet-wheel and cylinders back to starting-point.

5. The combination, substantially as described, with the gravitating circuit-closing lever, of the friction-clutch and revolving fans for retarding the descent of the same.

6. The combination, substantially as described, with the gravitating circuit-closing lever, of the friction-clutch, the revolving fans, and the adjustable counter-weight.

7. The combination, substantially as described, with the gravitating circuit-closing lever, of the friction-clutch and regulating-fans for retarding its descent, and the bell-crank lever and armature-arm for causing it to rise every time the main circuit is closed.

8. The circuit-closing lever carrying the two insulated contact-fingers of unequal length at its forward end—one in the local bell-circuit and the other in the local relief-circuit—in combination with the cylinder in the local bell-circuit having the signaling projection or rib, and with the cylinder in the local relief-circuit, substantially as described.

9. The circuit-closing lever consisting of the metal parts X Z, the former carrying the contact-finger and the latter the gravitating friction-block, and the insulating intermediate part, Y, connecting said parts X Z, substantially as described.

10. The combination, substantially as described, with the keeper and actuating-pawl, of the pivoted lever for holding the said actuating-pawl and keeper out of engagement with the ratchet-wheel during the closure of the relief-circuit, and the rotating cam for withdrawing said lever when the ratchet-wheel has reached normal or starting point.

11. The combination of a main charged line or circuit, a series of stations on said main line, each having an electro-magnet connected into the main line, a local bell-circuit, a local relief-circuit, two rotating cylinders—one having a signaling projection or rib and forming part of the local bell-circuit and the other forming part of the relief-circuit—a gravitating circuit-closing lever having a retarded downward movement, and adapted, when down, to close either the bell or the relief circuits, mechanism actuated by the armature of the main-line magnets for rotating forward the cylinders and for keeping the circuit-closing lever elevated during such forward rotation, electro magnet or magnets in the local relief-circuit, whose armature controls a keeper for said cylinders, means for bringing the cylinders back to starting-point upon the closure of the relief-circuit, and a key or other contrivance for opening and closing the main line, the signaling-projection on the rotating cylinder which forms part of the local bell-circuit at each station, being arranged at different distances from the normal or starting point, so that upon the rupturing of the main circuit a given number of times by the signaling-key at any station, in the manner described, the circuit-closing levers at all the stations will be caused to drop and complete the relief-circuit and reset the instruments at all the stations save one, and at that one station complete the bell-circuit and give the signal, substantially as described.

12. The combination of a main charged line or circuit, a series of stations thereon, each provided with an electro-magnet connected to the main line, and through the magnetization and demagnetization of which an actuating mechanism is set into operation to advance a cylinder forming part of a local bell-circuit and another cylinder forming part of a relief-circuit, a gravitating circuit-closing lever forming part of both bell and relief circuits, and adapted to be moved rapidly upward by the operation of the aforesaid actuating mechanism, and to fall with a retarded motion to make contact either with a projection on the cylinder in the bell-circuit or with the cylinder in the relief-circuit, according to the location of said cylinders, an electro-magnet in the relief-circuit, which, when the relief circuit is closed, operates to release and reset the cylinders at all the stations except the one called, and with means at each station for opening and closing the main circuit, substantially as described.

GEORGE W. HOWSER.

Witnesses:
THOMAS CRATTY,
H. K. TENNEY.